Oct. 21, 1958 W. C. BELK 2,856,846
SEPARATOR
Filed Oct. 28, 1953 2 Sheets-Sheet 1
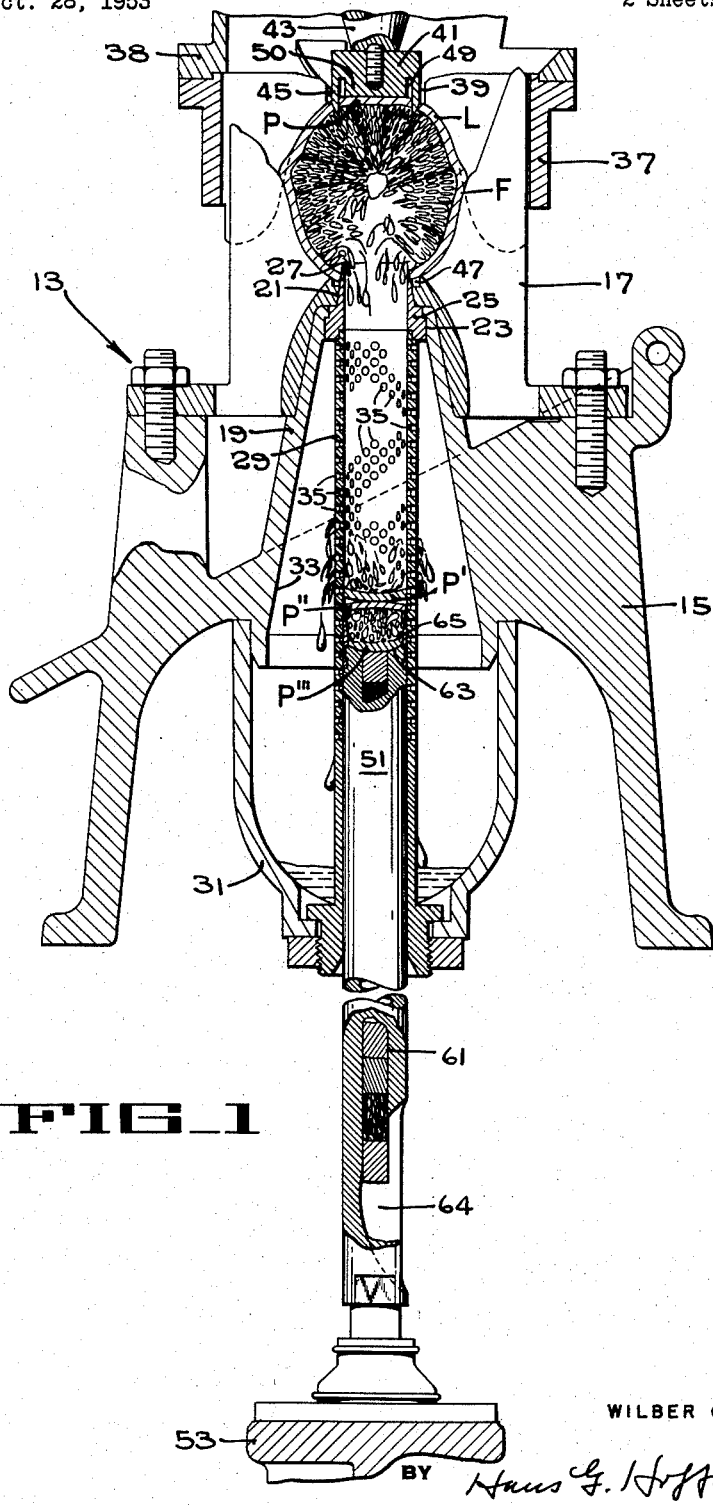
FIG_1
INVENTOR
WILBER C. BELK
BY Hans G. Hoffmeister
ATTORNEY

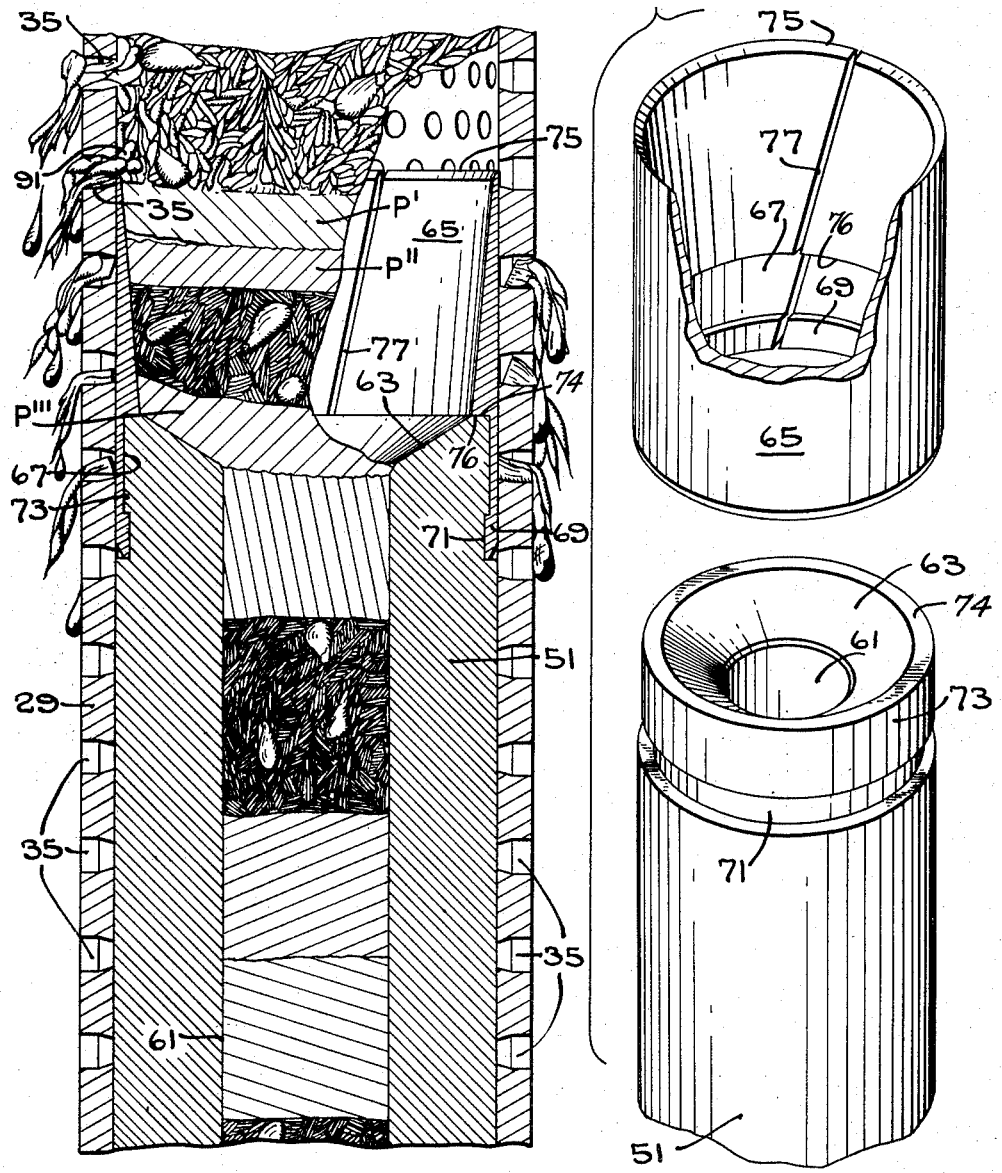

United States Patent Office 2,856,846
Patented Oct. 21, 1958

2,856,846

SEPARATOR

Wilber C. Belk, Lakeland, Fla., assignor to Food Machinery and Chemical Corporation, San Jose, Calif., a corporation of Delaware Application October 28, 1953, Serial No. 388,781

4 Claims. (Cl. 100—108)

The present invention relates to apparatus for separating liquid and solid material of the type which employs a tubular strainer within which a movable pressure exerting member, such as a plunger, is disposed.

One object of the present invention is to provide a new and improved separator of the above mentioned type.

Another object is to provide a separator of the type referred to in which the build-up of solid material on the interior surface of the strainer is prevented.

Another object is to provide a separator of the type referred to in which the perforations of the strainer do not become clogged with solid material.

Another object is to provide a separator of the above type wherein the pressure exerting member will not bind in the tubular strainer due to accumulations of solid material on the interior strainer surface.

These and other objects and advantages of the present inventoin will become apparent from the following description and the accompanying drawings in which:

Fig. 1 is a fragmentary longitudinal section of a juice extracting mechanism embodying the present invention, taken along the common axis of the juice extracting cups and the straining tube, certain parts being shown in elevation.

Fig. 2 is an enlarged longitudinal section of a poriton of the mechanism shown in Fig. 1, the mechanism being shown in a different operative position.

Fig. 3 is an enlarged exploded perspective of a part of the mechanism shown in Fig. 1, certain portions thereof being broken away.

The separator of the present invention is illustrated in connection with a citrus fruit juice extracting apparatus 13 (Fig. 1) of the type described and claimed in U. S. Patent No. 2,649,730, to James M. Hait, issued August 25, 1953, and in the co-pending application of Elmer F. Frost and myself, Serial No. 338,234, filed February 24, 1953. However, it should be understood that the present invention may be readily adapted for use with other types of separating apparatus and that the present embodiment is intended to be exemplary only. Only those portions of the entire juice extractor 13 necessary for a complete understanding of the present invention have been shown and for complete details of the construction and operation of the juice extractor 13, reference should be had to the above mentioned patent.

The citrus fruit juice extractor 13 (Fig. 1) comprises a bedplate 15 having a stationary, fruit-receiving, digitated lower cup 17 seated in an upwardly open position on a hollow, frusto-conical portion 19 of the bedplate. The cup 17 and frusto-conical portion 19 are provided with axially disposed vertically aligned apertures 21 and 23, respectively, which receive a tubular knife 25 having an annular blade 27 that extends upwardly beyond the aperture 21 and into the cavity of the cup 17. The knife 25 is supported on the upper end of a cylindrical straining tube 29 secured in an upwardly extending position in the bottom of a juice collecting sump 31. The upper portion of the sump 31 is sealed to the lower end of a downwardly flaring juice passage 33 formed in the bedplate 15. The wall of the straining tube 29 is provided with a multiplicity of small perforations 35 from the upper end thereof to a point a slight distance below the lower end of the juice passage 33.

In vertical alignment with the stationary digitated lower cup 17, and disposed directly thereabove, is an inverted, digitated upper cup 37 rigidly mounted on a vertically reciprocable head 38 for movement into and out of interdigitation with the stationary cup 17. The cup 37 is provided axially with an aperture 39 into which a cutter assembly 41 protrudes supported on a tapered post 43 formed integral with the head 38. The cutter assembly 41 has a downwardly directed circular blade 45 that is in vertical alignment with an annular recess 47 formed in the stationary cup 17 around the tubular knife 25. In the lowermost position of the vertically movable head 38, the circular cutter blade 45 extends down into the recess 47, and the annular blade 27 projects upwardly into an annular recess 49 defined by the cutter blade 45 and a cylindrical boss 50 internally concentric therewith.

The straining tube 29 slidably receives the free upper end of a cylindrical plunger 51 which is fastened in an upwardly extending position to a vertically reciprocable crosshead 53. The plunger 51 is provided with an axial passage 61 which communicates with the interior of the straining tube 29 through an outwardly flaring aperture 63 in the upper end of the plunger. The lower end of the passage 61 connects with a longitudinal slot 64, milled in the side of the plunger 51 adjacent its point of attachment to the crosshead 53.

A short annular sleeve 65 (Fig. 2) is loosely telescoped over the upper end of the plunger 51 and is secured thereto against axial displacement by means of a groove 67 (Fig. 3) and a flange 69 on the interior of the sleeve adjacent the lower end thereof, and a cooperating groove 71 and a flange 73 on the exterior of the plunger 51 near its upper end. An annular end face 74 of the plunger 51 lies in abutting engagement with a radial wall 76 of the sleeve 65. The sleeve 65 is made of a resilient material, such as heat treated stainless steel, has a knife edge 75 on its uper end, and is slit longitudinally and obliquely from end to end, as shown at 77. In view of the resiliency of the sleeve 65 and the slit 77 therein, the sleeve may be easily and quickly attached to or removed from the plunger 51 when the plunger is removed from the tube 29. To secure the sleeve 65 on the plunger 51, the sleeve is first spread apart so that the locking flanges 69 and 73 will clear each other. The sleeve is then telescoped over the uper end of the plunger and released, whereupon the grooves 67 and 71 receive the flanges 73 and 69, respectively, thereby holding the sleeve against axial movement on the plunger. To remove the sleeve 65 from the plunger 51, the above procedure is reversed.

The dimensions of the plunger 51 and the interior of the sleeve 65 are such that the sleeve 65 may move a small amount diametrally on the plunger thereby adapting the sleeve for rotation relative to the plunger while the slit 77 permits slight radial compression of the sleeve. The normal outside diameter of the sleeve 65 is slightly greater than either the outside diameter of the plunger 51 or the interior diameter of the straining tube 29. Consequently, when the plunger is positioned within the tube 29 the wall of the tube squeezes the slit sleeve 65 and holds it in a slightly compressed position. With this construction a continuous resilient contact between the sleeve knife edge 75 and the interior surface of the straining tube 29 is assured.

In operation with the upper reciprocating cup 37 in its raised position (not shown) and the plunger 59 in its lowered position (also not shown), a citrus fruit F (Fig. 1) is fed into the stationary lower cup 17 of the juice extractor 13. The cup 37 and plunger 59 are then moved toward the fruit resting in the cup 17, and when the cup 37 reaches a position slightly above that shown in Fig. 1 the fruit F is firmly gripped by both cups 17 and 37 which apply a substantially uniform pressure to the fruit at all points of contact therewith. At this time, the blade 45 punches a plug P out of the top surface of the fruit F and the blade 27 cuts a similar plug P' from the lower end of the fruit F. While the cup 37 continues its downward movement toward cup 17 the lower plug P' of the fruit is forced downwardly into the straining tube 29 with the juice, pulp and seeds of the fruit following it as the fruit is more and more compressed between the cups. The plug P' eventually comes to rest on the plug P'' cut from the upper portion of the immediately preceding fruit during the continuous operation of the machine. The plug P'' is positioned just within the upper end of the sleeve 65 during this phase in the operation of the machine, as best seen in Fig. 1, and this plug P'' is prevented from moving through the sleeve 65 and the plunger passage 61 at this time by the tightly compressed extraction residues of a large number of previously processed fruit. These compressed residues of the previously processed fruit within the passage 61 consist of the plugs cut by the knife blades 27 and 45, the expressed fruit pulp, and the seeds of the previously treated fruit. During the above described initial stage of juice extraction, the outwardly sloping wall of the blade 45 directs the fruit peel L upwardly into the aperture 39 through which eventually the entire peel, with the exception of the plugs P and P', and the pulp and seeds will pass.

As the juice, pulp and seeds of the fruit F (Fig. 1) are pressed into the straining tube 29 by the descent of the inverted cup 37, the plunger 51 moves upward, reducing the effective volume of the straining tube 29 and forcing the fruit juice out through the perforations 35 into the juice passage 33 leading to the juice collecting sump 31, thus separating the juice of the fruit F from its seeds and pulp. At this time the lower plug P' is forced down inside the sleeve 65 (Fig. 2) by the extraction pressure within the tube 29, and as the plunger 51 continues its rise the seeds and pulp of the fruit F are also pressed into the sleeve. As this extraction residue is forced into the sleeve 65, the plugs P'', P''' and the residue therebetween from previously processed fruit within the sleeve is forced into the passage 61 which in turn forces residue already within the passage out of the slot 64 at the lower end of the plunger 51 into any convenient receptacle (not shown). By the time the sleeve knife edge 75 passes the uppermost perforation in the straining tube 29, substantially all the juice of the fruit F has been separated from its pulp and seeds. When the cup 37 reaches its lowermost position, wherein the cups 17 and 37 are fully interdigitated, the boss 50 pushes the upper plug P inside the upper end of the sleeve 65 as the sleeve moves upwardly out of the tubular blade 25 and into the cutter body recess 49. Simultaneously with the entrance of the plug P into the sleeve 65, the peel L is completely extruded from between the cups 17 and 37 through the aperture 39. Subsequently, the cup 37 and the plunger 51 move apart, the cup 37 rises out of interdigitation with the cup 17 so that the latter may receive another fruit while the plunger 51 descends with the extraction residue to position itself for the extraction of juice from the next fruit.

During the separation of the juice from the pulp and seeds, many of the fine fibers and membranes of the pulp 91 (Fig. 2) are pressed against the perforated inner surface of the straining tube 29, and become caught in the perforations 35 so that they hang partially out of the tube and partially within the tube. If these fibers are not removed from the inner surface of the tube and from the perforations they will build up and mat thereon thus clogging the perforations and causing the plunger 51 to bind in the straining tube 29. Any such build-up of fibers in the present device is prevented by the action of the sleeve 65. As mentioned previously, the resiliency of the slit sleeve 65 maintains it, and particularly its knife edge 75, in close contact with the inner surface of the straining tube 29. As the plunger 51 rises in the straining tube 29, the knife edge 75 of the sleeve 65 scrapes the inner surface of the tube 29 removing the matted pulp therefrom and severing any fibers or membranes which may be caught in the perforations 35. In addition to the resiliency of the sleeve 65, the sleeve is pressed against the inner surface of the tube 29 by the outward pressure exerted by the pulp of previously processed fruit which is compressed therein and by the extraction pressure created within the straining tube 29 when the plunger 51 rises within the tube. In fact, even if the normal outer diameter of the sleeve 65 is equal to, or slightly smaller than, the inner diameter of the strain-tube 29, the above mentioned extraction pressure is alone sufficient to expand the slit, resilient sleeve 65 so that its knife edge 75 scrapes the inner surface of the tube 29 to remove pulp and the like therefrom during upward movement of the plunger 51. The expansive pressure of the sleeve 65 against the inner surface of the tube 29, regardless of how it is achieved, keeps the knife edge 75 well sharpened and allows the sleeve to automatically compensate for the wear of its outer surface and/or of the inner surface of the tube 29 so that the knife edge 75 is always maintained in proper cutting relation closely adjacent the inner wall of the straining tube.

While I have described a preferred embodiment of the present invention, it will be understood that various changes and modifications may be made in the details thereof without departing from the spirit and scope of the appended claims.

Having thus described the invention what I claim as new and desire to protect by Letters Patent is:

1. An apparatus for separating liquid and solid material comprising a perforated straining tube adapted to receive a liquid and solid mass, means movable within the straining tube for exerting pressure on the mass to force the liquid portion thereof out of the tube through its perforations and a longitudinally slit knife supported by the pressure exerting means and resiliently bearing against the inner surface of the tube, said knife being arranged to move over the inner surface of the tube and to cooperate with the inner edges of the perforations in said tube to shear solid material projecting from the perforations into the interior of said tube upon pressure exerting movement of said movable means.

2. An appartus for separating liquid and solid material comprising a perforated straining tube adapted to receive a liquid and solid mass, a tubular plunger reciprocable in the straining tube for pressing the liquid and solid mass whereby the liquid portion thereof is forced out of the straining tube through its perforations, and an elongated, longitudinally slit tubular knife conforming in its outer peripheral configuration to the internal peripheral configuration of the straining tube supported by the plunger and resiliently bearing against the inner surface of the straining tube to cooperate therewith to shear solid material projecting from the perforations into the interior of said tube upon reciprocation of the plunger, said elongated tubular knife arranged to receive the solid portion of the liquid solid mass therein during the pressure stroke of said plunger to expand said knife into firm sliding engagement with the internal surfaces of said straining tube.

3. An apparatus for separating liquid and solid material comprising a perforated straining tube adapted to receive a liquid and solid mass, a plunger reciprocable in the straining tube for pressing the mass whereby the liquid portion thereof is forced out of the staining tube through its perforations, and a longitudinally and obliquely slit tubular knife of resilient material similar in its outer peripheral configuration to the internal peripheral configuration of the straining tube supported for rotation on one end of the plunger, said knife being constructed and arranged to receive the solid portion of the liquid and solid mass therein during the pressure stroke of said plunger to expand said knife so that it cooperates with the inner edges of the perforations in the tube to shear solid material projecting from the perforations into the interior of said tube.

4. An appartus for separating liquid and solid material comprising a perforated straining tube adapted to receive a liquid and solid mass, a tubular plunger movable within the straining tube for exerting pressure on the mass to force the liquid portion thereof out of the tube through its perforations, said plunger having an outwardly flared aperture at one end thereof communicating with a passageway extending through said plunger, a transverse annular end face on said plunger defined by the largest peripheral edge of the flared aperture in said plunger and the outer periphery of said one end of the plunger, and an elongated resilient longitudinally and obliquely slit knife mounted for rotational movement on said one end of said plunger and held from longitudialy movement relative to said plunger during the pressure stroke of said plunger by said annular end face and being constructed and arranged to resiliently contact the inner surface of the straining tube, said knife having a tapered inner wall of shallower slope than that of said flared aperture and forming a continuation of the walls of said flared aperture for receiving a liquid and solid mass from said straining tube and partially compressing the solid portion of the liquid and solid mass within said tapered inner wall of said knife and for directing the solid portion into said flared aperture wherein said solid portion is compressed and thereafter advancing the solid mass into said passageway of said plunger upon compressive movement of said plunger within said straining tube.

References Cited in the file of this patent

UNITED STATES PATENTS

| | | |
|---|---|---|
| 1,010,190 | Seeley | Nov. 28, 1911 |
| 1,159,066 | Moore | Nov. 2, 1915 |
| 1,320,210 | Eckelbarger | Oct. 28, 1919 |
| 1,630,988 | Tyler | May 31, 1927 |
| 1,960,501 | Maull | May 29, 1934 |
| 2,346,561 | Delay | Apr. 11, 1944 |
| 2,568,284 | Harrison | Sept. 18, 1951 |
| 2,649,730 | Hait | Aug. 25, 1953 |
| 2,705,916 | Millgard | Apr. 12, 1955 |